(No Model.)

D. F. PACKER.
Harness.

No. 229,176. Patented June 22, 1880.

WITNESSES
Robert Everett
James J. Sheehy

INVENTOR
Daniel F. Packer.
J. Clement Smith.
ATTORNEY

United States Patent Office.

DANIEL F. PACKER, OF MYSTIC RIVER, CONNECTICUT.

HARNESS.

SPECIFICATION forming part of Letters Patent No. 229,176, dated June 22, 1880.

Application filed April 30, 1880. (No model.)

*To all whom it may concern:*

Be it known that I, DANIEL F. PACKER, of Mystic River, in the county of New London and State of Connecticut, have invented certain new and useful Improvements in Harness, &c; and I do hereby declare that the following is a full, clear, and exact description of the construction and operation of the same, reference being had to the annexed drawings, making a part of this specification, and to the letters and figures of reference marked thereon.

Figure 1:
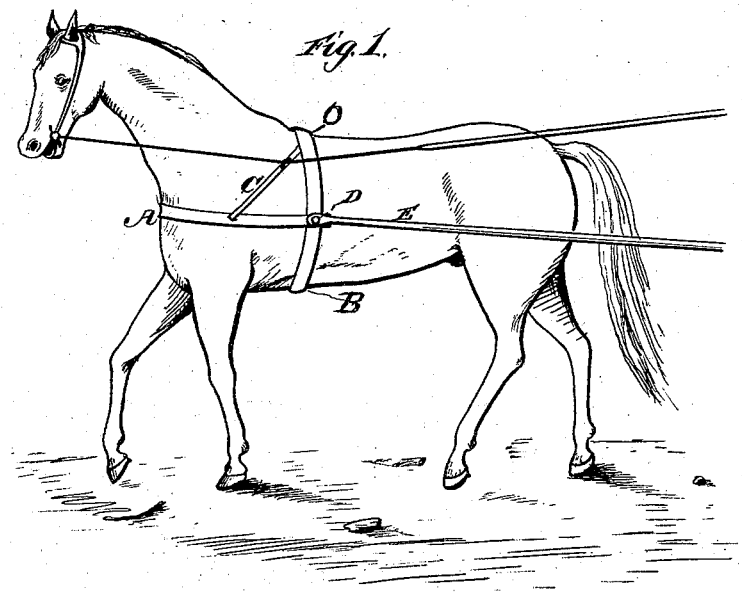
Figure 2:
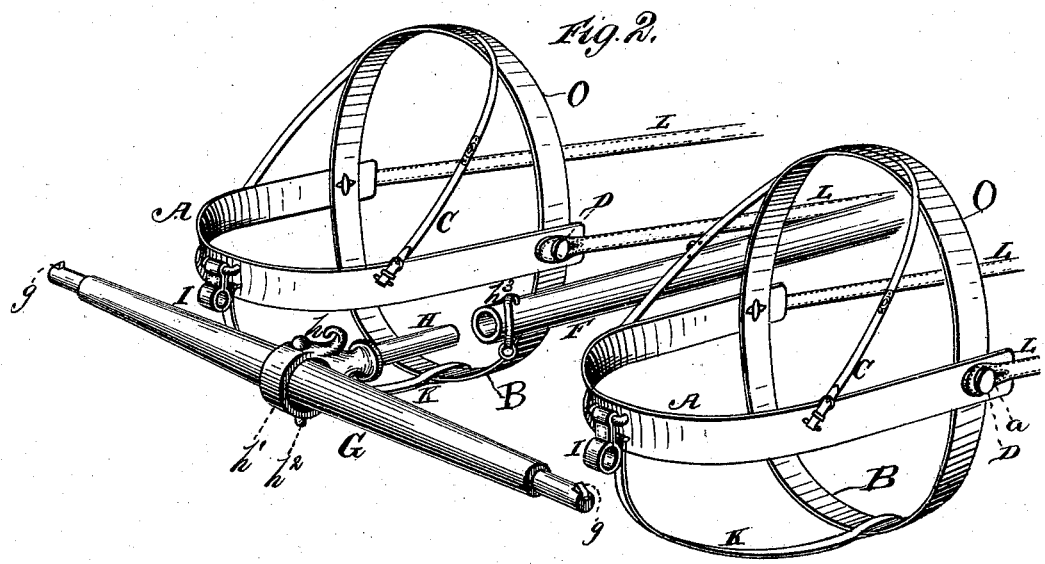

Figure 1 of the drawings is a representation of a horse, showing my harness applied, and Fig. 2 is a perspective view of the harness for two horses.

The object of my invention is to provide an improved harness for connecting horses to vehicles, both single and double, which will dispense with as much of the old style of harness as possible and leave the horse bare, so that it will present a clean sharp outline for appearance sake, and will be unincumbered with the weight and constant chafing of straps and unnecessary trappings.

A further object of my invention is to connect the end of the pole and the end of the shafts of vehicles directly to the body of the horse, so that the ends of the pole or shafts will not project beyond the breast of the horse and cause unnecessary strain upon the animal by thus limiting the vibration of the pole or shaft, the entire weight of the pole, &c., being thrown upon the back of the animal at the point where a load may be borne with the least fatigue and annoyance to the horse.

In the accompanying drawings, Figure 1 is a perspective view of a horse attached, by means of my invention, to the thills of a single vehicle; and Fig. 2, a perspective view of a double harness, showing the end of the pole and the yoke detached.

The most essential feature of my improved harness is the collar A, made of sheet metal and extending entirely around the breast of the horse, from the saddle and girth connections upon one side to a corresponding point upon the other side of the animal.

The collar A is struck up of sheet metal, preferably of steel, either polished, nickel-plated, or japanned, and made concave upon its inner face to prevent its edges from chafing or cutting the animal. The ends of the collar A are perforated at $a\ a$, and are connected at one of the perforations upon each side with the ends of the saddle O and girth B, by means of a stud or button, D, whereby the collar may be adjusted to suit the size of the animal. The girth is drawn tightly around the animal, so that any strain that can come upon the harness in backing or in going down hill will be amply resisted.

Suspension-straps C connect the saddle with the sides of the collar and hold the collar in a horizontal position, and prevent its forward end from sagging against the animal's breast.

In a single harness the ends of the thills or shafts are cut off and terminate at a point opposite the said point of connection between the girth and collar at the button D.

The shank of the button may pass through the end of the shafts E, and couples them directly and securely to the harness. In a single harness this is the only connection required, and the traces, breeching-straps, back strap, crupper, and breeching suspension-straps, may be dispensed with. The whole strain of the load will thus come upon the collar-strap around the horse's breast, and the weight of the shafts will fall directly upon the horse's back. The weight of the metal collar, through the suspension-straps, will also come upon the horse's back, and every strain that can come upon the animal will thus be borne with the least fatigue and annoyance to the horse.

A decided advantage is also obtained by the above-described mode of connecting the harness to the thills. The single-tree is thus dispensed with, and the ends of the thills will not project alongside of and beyond the horse's shoulders to chafe and rub against them. No projecting ends are exposed to penetrate or injure the body or person of whatever may be run into by the vehicle.

When double harness is used in connection with the vehicle the end of the pole F is cut off, as in the case of the thills, so that no damage can result from the team running into a vehicle in advance of them upon the road.

The pole terminates at a point immediately opposite the breasts of the animals, and a yoke, G, is connected, by a swivel or universal joint, with the end of the pole and by a hinged connection immediately to the forward part of the collar, so that the end of the pole is at all times under the complete control of the horses, and is not allowed to swing from side to side, and cause unnecessary strain to come upon the horses' necks. The swaying motion of the forward end of the pole is by this means almost entirely prevented, the undue strain and force thus exerted by the end of the pole being in proportion to the length of the pole and the distance from which the animal is connected to it.

A simple means for connecting the yoke G to the pole F at its middle portion with the end of the pole, and for connecting the ends of the yoke to the collars, is shown in Fig. 2, wherein the pole F is preferably formed of hollow sheet metal.

The end of a solid pole may be provided with a tube, into which a swivel-pin, H, passes, so that it may turn freely within the tube.

The head of the pin H is provided with a hook, $h$, and a short strap connected to the pole may be hitched over the hook, by which means the pin is held in place but allowed to turn freely in the end of the pole. The yoke G passes through an eye, $h'$, in the end of the pin H, and a pivot-pin, $h^2$, passes through them both, so that the yoke will be allowed a horizontal vibratory movement. The ends of the yoke will thus be allowed free movement within a given radius. The ends of the yoke are attached to the forward side of the collar A by means of a loop, I, secured to the collar by a staple that spans it. The loops are prevented from slipping off of the ends of the yoke by means of spring-catches $g$ on the ends of the yoke.

When double harness is employed a martingale or strap, K, is secured to the forward portion of the collar and passes between the fore legs of the horse, and is connected to the girth, so that the swaying of the yoke will not cause the collar to rub against the horse's breast.

When the double harness is employed traces L L serve to connect the stud or button D with the single-trees in the usual way. The traces take the entire pulling-strain upon the horses, so that a light strap, $h^3$, only is used to hold the pin H in place.

By means of the above-described connections unnecessary trappings are dispensed with, and the harness is so simplified that the most inexperienced person can attach them to the horse. The animal, when hitched to the vehicle, is nearly bare, and is therefore not fretted and disfigured by straps and fittings.

The metal collar A may by a few strokes of the hammer be made to conform accurately to the shape of the horse's breast. Sufficient rigidity is thus obtained to admit of the direct attachment of the end of the yoke to the front of the collar A, so that there is no play or flexure between them. I thus avoid all lost motion between the animal and the end of the pole or thill of the vehicle, which lost motion is essential when flexible harness loosely fitted to the animal is employed. The collar also forms a brace for the horse's shoulders, and when the girth is tightly drawn in connection with such collars the harness serves in every part as a brace. The collar thus serves as a bail to the shafts when single harness is employed, and may be rigidly attached to the ends of the shafts, the girth simply serving to hold the shafts in position and aid in backing.

Many advantages derived from the use of the above-described harness could be enumerated if deemed necessary.

I claim as my invention and desire to secure by Letters Patent—

1. A harness for horses, consisting of the metal collar A, adapted to fit closely to the horse, to pass around his breast from one side to the other, in combination with a girth, B, and suspension-strap C, arranged to be connected to the shafts or pole of the vehicle, substantially as described.

2. A harness for double vehicles, consisting of the metal collar A, girth B, suspension-strap C, martingale K, and loop I, secured to the breast of the collar and adapted to be connected with the traces and yoke of a double vehicle, substantially as described.

3. The combination of the metal collar A, girth B, suspension-strap C, martingale K, loop I, and yoke G, passing through the eye of and pivoted to a pin, H, swiveled in the end of the pole, substantially as and for the purpose described.

In testimony that I claim the above I have hereunto subscribed my name in the presence of two witnesses.

DANIEL F. PACKER.

Witnesses:
ROBERT EVERETT,
JAMES J. SHEEHY.